(12) United States Patent
Yasrebi et al.

(10) Patent No.: US 8,789,160 B2
(45) Date of Patent: Jul. 22, 2014

(54) FUNCTION-BASED AUTHORIZATION TO ACCESS ELECTRONIC DEVICES

(75) Inventors: Mehrad Yasrebi, Austin, TX (US); Niral Sheth, Austin, TX (US); James Jackson, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 830 days.

(21) Appl. No.: 12/399,559

(22) Filed: Mar. 6, 2009

(65) Prior Publication Data

US 2010/0229226 A1 Sep. 9, 2010

(51) Int. Cl.
*G06F 7/04* (2006.01)

(52) U.S. Cl.
USPC ............ 726/9; 726/5; 726/6; 726/19; 726/27; 709/206

(58) Field of Classification Search
USPC ............................................. 726/6; 709/206
See application file for complete search history.

(56) References Cited

U.S. PATENT DOCUMENTS

| | | | |
|---|---|---|---|
| 6,041,355 A | 3/2000 | Toga | |
| 6,072,860 A | 6/2000 | Kek et al. | |
| 6,256,393 B1 | 7/2001 | Safadi et al. | |
| 7,016,672 B1 | 3/2006 | Lipsit | |
| 7,046,139 B2 | 5/2006 | Kuhn et al. | |
| 7,116,975 B1 | 10/2006 | Link, II et al. | |
| 7,428,750 B1 | 9/2008 | Dunn et al. | |
| 7,975,287 B2* | 7/2011 | Hung | 726/2 |
| 8,380,169 B2* | 2/2013 | Gogic | 455/411 |
| 2002/0040441 A1* | 4/2002 | See et al. | 713/202 |
| 2003/0225472 A1* | 12/2003 | Kato | 700/117 |
| 2004/0221303 A1 | 11/2004 | Sie et al. | |
| 2005/0193134 A1* | 9/2005 | Syrjala | 709/230 |
| 2005/0246447 A1* | 11/2005 | Smidt et al. | 709/229 |
| 2007/0073874 A1 | 3/2007 | Moghaddam et al. | |
| 2007/0083895 A1 | 4/2007 | McCarthy et al. | |
| 2007/0143838 A1* | 6/2007 | Milligan et al. | 726/15 |
| 2007/0245398 A1 | 10/2007 | Roden | |
| 2007/0261104 A1 | 11/2007 | McIntyre et al. | |
| 2008/0065746 A1 | 3/2008 | Moghaddam et al. | |
| 2008/0163355 A1* | 7/2008 | Chu | 726/12 |
| 2009/0098858 A1* | 4/2009 | Gogic | 455/411 |
| 2009/0165146 A1* | 6/2009 | Wenzlik et al. | 726/28 |
| 2013/0055358 A1* | 2/2013 | Short et al. | 726/4 |

OTHER PUBLICATIONS

Chiang, K., "A Prototype Implementation of a Time Interval File Protection System in Linux", Sep. 2006, Naval Postgraduate School, Monterey, CA, pp. 1-226.

* cited by examiner

*Primary Examiner* — Kaveh Abrishamkar
(74) *Attorney, Agent, or Firm* — Toler Law Group, PC

(57) ABSTRACT

Systems and methods to secure authorized access are disclosed. A method includes receiving, an electronic device, a request to generate function-authorization settings including function-access data associated with a particular function of the electronic device to be protected. The method also includes prompting for and receiving function-access data. The received function-access data includes first function-access data that specifies access credentials of a first user to access the particular function and second function-access data that specifies access credentials of a second user to access the particular function. The method also includes associating the received function-access data with the particular function and storing the function-authorization settings including the received function-access data at a memory of the electronic device.

25 Claims, 7 Drawing Sheets

US 8,789,160 B2

FUNCTION-BASED AUTHORIZATION TO ACCESS ELECTRONIC DEVICES

FIELD OF THE DISCLOSURE

The present disclosure relates generally to controlling access to functions on an electronic device.

BACKGROUND

User interfaces generally mediate access to computing resources, which incorporate or can affect sensitive data and devices. Access to such user interfaces may be restricted using initial explicit or implicit credentials that are provided during a login or startup procedure. An example of implicit credentials is physical possession of a cellular phone. An example of explicit credentials is logging in to an internet portal using a user ID and password.

DETAILED DESCRIPTION

Figure 1:
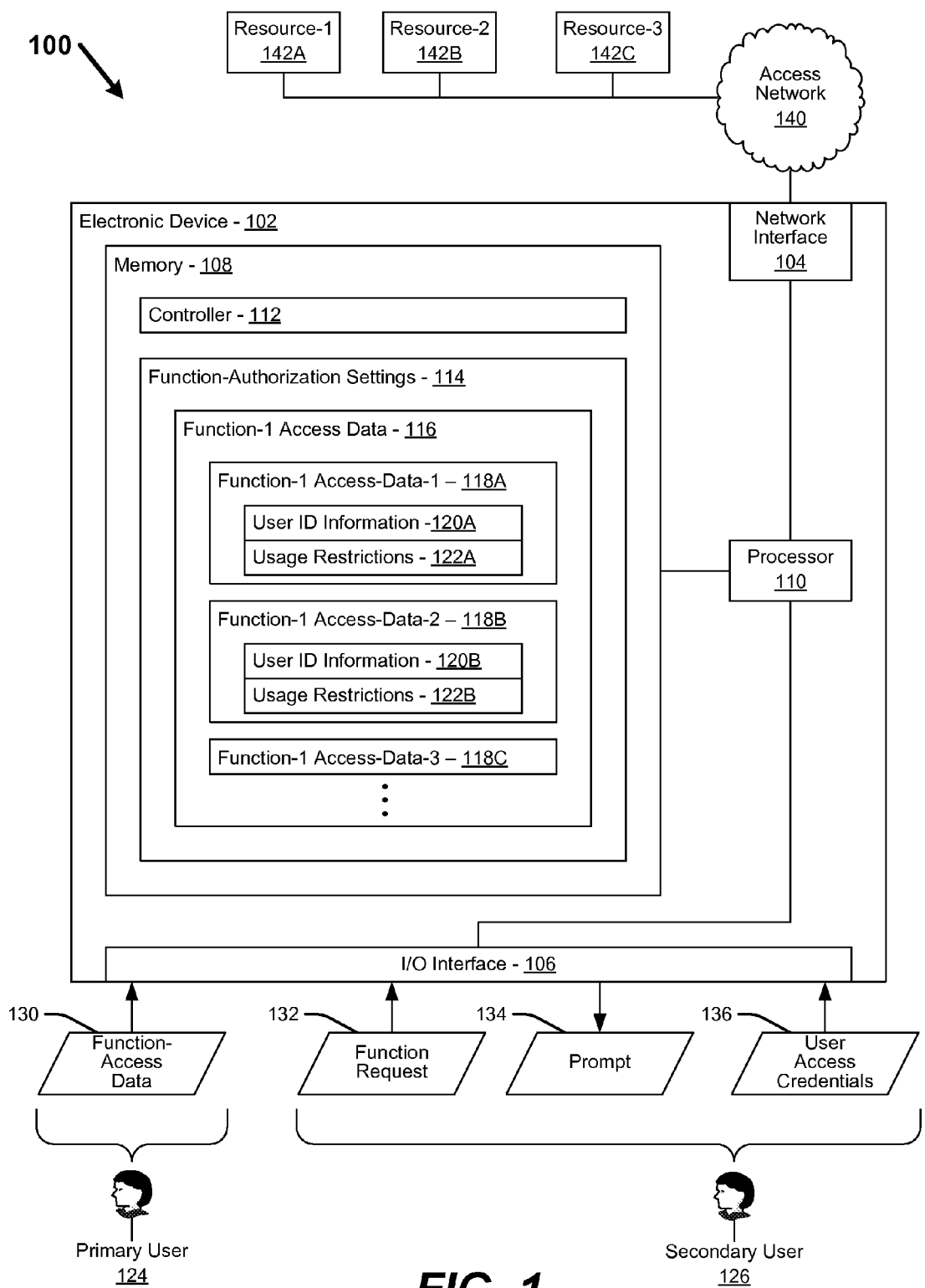
FIG. 1 is a diagram of an embodiment of a system to provide function-based authorization to access an electronic device.

Systems and methods of providing function-based authorization to access an electronic device are disclosed. In a first particular embodiment, a method is disclosed that includes receiving, at a mobile communication device, a request to generate function-authorization settings including function-access data associated with a particular function of the mobile communication device to be protected. The method includes prompting for and receiving the function-access data from an authorized user. The received function-access data includes first function-access data that specifies access credentials of a first user to access the particular function to be protected and second function-access data that specifies access credentials of a second user to access the particular function to be protected. The method also includes associating the received function-access data with the particular function to be protected and storing the function-authorization settings including the received function-access data at a memory of the mobile communication device.

In a second particular embodiment, a computer-readable medium is disclosed that includes computer-executable instructions that, when executed, cause an electronic device to perform operations including receiving, at the electronic device, a request to generate function-authorization settings including function-access data associated with a particular function of the electronic device to be protected. The operations also include prompting for and receiving the function-access data from an authorized user. The received function-access data includes first function-access data that specifies access credentials of a first user to access the particular function to be protected and second function-access data that specifies access credentials of a second user to access the particular function to be protected. The operations also include associating the received function-access data with the particular function to be protected and storing the function-authorization settings including the received function-access data at a memory of the electronic device.

In a third particular embodiment, a computer-readable medium is disclosed that has stored thereon a data structure. The data structure includes computer-executable instructions to perform a particular function associated with an electronic device. The data structure includes function-authorization settings including function-access data associated with the particular function. The function-access data includes first function-access data that specifies access credentials of a first user to access the particular function and second function-access data that specifies access credentials of a second user to access the particular function. The data structure includes computer-executable instructions to perform operations including receiving, at the electronic device, a request to perform the particular function. The operations include prompting for user access credentials in response to receiving the request and receiving the user access credentials in response to prompting for the user access credentials. The operations include determining whether the received user access credentials match the function-access data associated with the particular function. The operations include performing the particular function in accordance with usage restrictions of the function-access data associated with a particular user identified by the received user access credentials when the received user access credentials match the function-access data associated with the particular function.

In a fourth particular embodiment, a mobile communication device is disclosed that includes an antenna, a transceiver coupled to the antenna, an input/output (I/O) interface, a processor coupled to the transceiver and to the I/O interface, and a memory device. The memory device includes executable instructions that, when executed by the processor, cause the mobile communication device to perform operations including receiving, via the I/O interface, a request to generate function-authorization settings including function-access data associated with a particular function of the mobile communication device. The operations include prompting, via the I/O interface, for the function-access data and receiving, via the I/O interface, the prompted for function-access data. The received function-access data includes first function-access data that specifies access credentials of a first user to access the particular function and second function-access data that specifies access credentials of a second user to access the particular function. The function-authorization settings are stored at the memory device.

Referring to FIG. 1, an illustrative embodiment of a system 100 to provide function-based authorization to access an electronic device is disclosed. The system 100 includes an electronic device 102 connected to an access network 140. The access network 140 provides the electronic device 102 with access to resources 142 accessible to the access network 140. The resources may include a web site, an email server, a messaging server, or a video server, for example. The electronic device 102 includes a network interface 104, an I/O interface 106, a memory 108, and a processor 110. The network interface 104 is connected to the access network 140 and is configured to provide the electronic device 102 with access to the resources 142 via the access network 140. The I/O interface 106 is configured to output information to one or more users and to receive information from the one or more users. In particular embodiments, the electronic device 102 provides a windowing environment through which users may interact with the electronic device 102. For example, inputs may be received from users via a windowing environment and outputs may be provided to users via the windowing environment.

The memory 108 includes a controller 112 and function-authorization settings 114. The controller 112 includes instructions, executable by the processor 110, to provide function-based authorization to access the electronic device 102. In particular embodiments, the controller 112 is implemented separately from a windowing environment provided by the electronic device 102. In this manner, the controller 112 can be implemented to be portable from a first windowing environment to a second windowing environment with little or no necessary modifications. The function-authorization settings 114 include function-1 access data 116 associated with a particular illustrative function, Function-1. In a particular embodiment, Function-1 is a program that can be invoked via the electronic device 102. For example, in a windowing environment provided to a user, the user may invoke the program by double-clicking on a selectable icon presented to the user in a window provided by the windowing environment. In another particular embodiment, Function-1 is an internet-access function that enables the electronic device 102 to access the Internet. For example, in a windowing environment provided to a user, the user may invoke a browser to access the Internet by double-clicking on a selectable icon representing the browser. In another embodiment, Function-1 comprises access to a subscription service associated with the electronic device 102. In another embodiment, performing Function-1 accrues charges to a subscriber of the subscription service. In yet another embodiment, Function-1 enables the electronic device 102 to send and receive email messages. In yet another embodiment, Function-1 enables the electronic device 102 to send and receive instant messages.

The function-1 access data 116 includes first function-1 access-data-1 118A and second function-1 access-data-2 118B. The first function-1 access-data-1 118A includes user ID information 120A. The user ID information 120A specifies credentials of a first user to access Function-1. The first user may be a primary user 124 or a secondary user 126. In particular embodiments, the credentials include user identification and password information. The first function-1 access-data-1 118A also includes usage restrictions 122A. The usage restrictions 122A indicate restrictions, if any, on how, whether and/or when the first user is authorized to access Function-1. In particular embodiments, the usage restrictions 122A include temporal restrictions. For example, the temporal restrictions may indicate that the first user is authorized to access Function-1 for a limited amount of time. In another example, the temporal restrictions indicate a time frame during which the first user is authorized to access Function-1. In another example, the temporal restrictions indicate that the first user is authorized to access Function-1 regardless of the current time. In particular embodiments, the usage restrictions 122A include constraints on the first user's access to Function-1. For example, if Function-1 is for a browser's access to the Internet, the usage restrictions 122A may enable invocation of the browser function only until 7:30 PM on a daily basis. In another example, the usage restrictions 122A indicate that the first user is authorized to access Function-1 without restrictions. For example, the primary user 124 may be authorized to access Function-1 without restrictions. In one particular embodiment, function-1 access-data-1 118A is configured to be common across all of the programs on the electronic device 102, and corresponds to the primary user 124. The usage restrictions 122A allow the primary user 124 to access Function-1 without restrictions. In another particular embodiment, the contents of function-1 access-data-1 118A are implicit and enforced globally across all of the programs that are accessible from the user interface, while the primary user 124 is logged into the operating system environment and is using the user interface.

Figure 7:
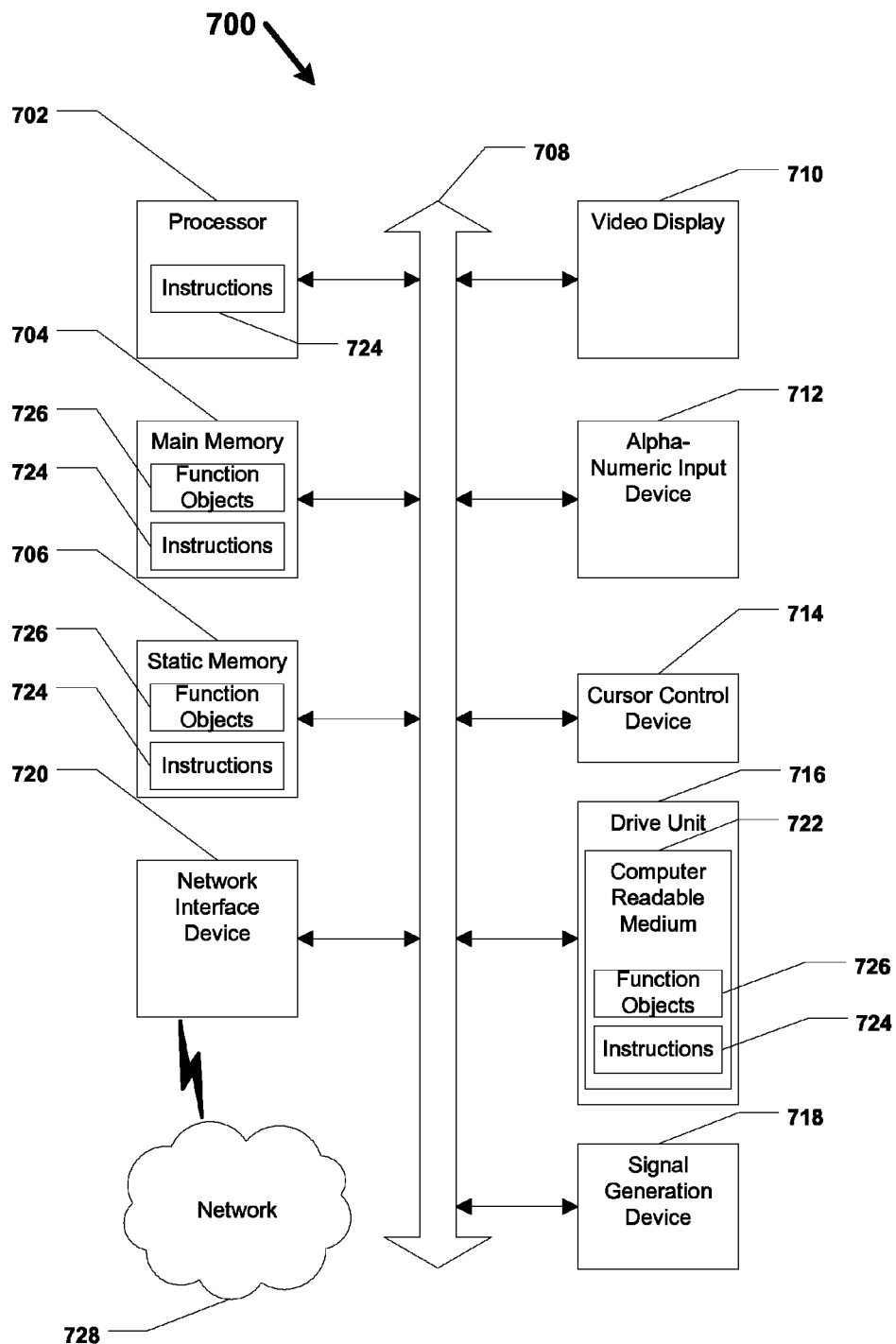
FIG. 7 is an illustration of an illustrative embodiment of a general computer system.

The electronic device 102 may comprise a general computing device, such as the general computing device 700 illustrated in FIG. 7. For example, the computing device 102 may include a personal computer, a server, a set top box, or a mobile communication device. In the case of a personal computer, the user ID information 120A may be that of the primary user 124, who is logged in to the operating system of the personal computer, and the usage restrictions 122A may be initialized by the primary user 124 or by an administrator, and may be changed later by the user or the administrator.

During operation, a primary user 124 (e.g., a parent) may create or amend the function-authorization settings 114 to protect Function-1. Accordingly, the primary user 124 may enter, and the electronic device 102 may receive, a request to generate function-authorization settings 114 including function-1 access data 116 associated with Function-1. The electronic device 102 may prompt for and receive user-authorization credentials identifying a particular user (e.g., the primary user 124) authorized to generate the function-authorization settings. For example, a windowing environment provided by the electronic device 102 may present a window to the particular user, allowing the particular user to enter the user-authorization credentials. The electronic device 102 may then prompt for the function-access data. For example, the electronic device 102 may present a window-based interface to the particular user, allowing the particular user to enter the function-access data. The electronic device 102 may then receive the function-access data 130. The function-access data 130 includes first function-1 access-data-1 118A that specifies access credentials of a first user (e.g., a first child) to access Function-1 and second function-1 access-data-2 118B that specifies access credentials of a second user (e.g., a second child) to access Function-1. The electronic device 102 associates the received function-access data 130 with Function-1 and stores the function-authorization settings 114 including the received function-access data 130 at the memory 108 of the electronic device 102. The function-authorization settings 114 are stored in memory 108 and are used by the user interface mechanism (for example, the windowing environment). The user interface mechanism may be separable from the underlying operating system and may be implemented on various operating systems. Secondary User ID Information (120A and/or 120B, depending on the particular embodiment) need not be known to the underlying operating system.

Similarly, the primary user 124 may protect functions associated with the electronic device 102 other than Function-1, each of which may have one, two, or three or more authorized users depending on requests received from the primary user 124. In a particular embodiment, the function-access data associated with a Function-2 includes first function-2 access-data-1 that specifies access credentials of a first user to access the function, but does not include second function-2 access-data-2 that specifies access credentials of a second user to access the function. Thus, only one user is authorized to access Function-2. In another particular embodiment, the function-access data associated with a Function-3 includes second function-3 access-data-2 and third function-3 access-data-3 in addition to the first function-3 access-data-1. The first function-3 access-data-1 may specify access credentials for the primary user 124 while the second function-3 access-data-2 and the third function-3 access-data-3 may each specify access credentials for a different secondary user. Thus, there are three different users that are authorized to access Function-3. In another particular embodiment for another function Function-4, the function-access data for Function-4 may be such that no credentials are required (that is, anybody can invoke Function-4).

In particular embodiments, the user-authorization credentials that the electronic device 102 prompts for and that identify a particular user authorized to generate the function-authorization settings 114, are determined at login. For example, during a login procedure, a primary user 124 may enter a userid and a password. In a particular embodiment, entering the userid and password provides the user access to an operating system account. The electronic device 102 may save the entered userid and password as the credentials required to be entered in order to be authorized to generate the function-authorization settings 114. Thus, a primary user 124 may login using credentials identifying the primary user 124 as having authorization to generate function-authorization settings 114. The primary user 124 can then allow secondary users 126 to have access to the electronic device 102 while the primary user 124 is still logged in (to the operating system account, for example), knowing that a secondary user 126 will not be authorized to generate the function-authorization settings 114 if the secondary user 126 does not have the primary user's 124 userid and password. If the secondary user 126 generates a request to generate the function-authorization settings 114, the electronic device prompts for the primary user's 124 userid and password. Unless the secondary user 126 enters the correct userid and password, the electronic device 102 denies the secondary user's 126 request to generate the function-authorization settings 114.

Each primary user 124 may provide different function-authorization settings 114 for different secondary users 126. For example, the electronic device 102 may associate different credentials identifying different primary users 124 with different function-authorization settings 114. When a first primary user 124 logs in using first credentials, the electronic device 102 may save the first credentials as the credentials required to be entered in order to be authorized to generate a first set of function-authorization settings 114. When a second primary user 124 logs in using second credentials, the electronic device 102 may save the second credentials as the credentials required to be entered in order to be authorized to generate a second set of function-authorization settings 114. In this manner, each primary user 124 can customize the access of secondary users 126 to protected functions on the electronic device 102 while the primary user 124 is logged into the electronic device 102.

By way of further example, the login of the primary user may be an implicit login. The credentials prompted for by the electronic device 102 identify a particular user authorized to generate the function-authorization settings 114 and may be determined during setup or initialization of the electronic device 102. Each time the electronic device is powered up, the credentials determined during setup or initialization may be used as the credentials required to be entered in order to be authorized to generate the function-authorization settings 114. If the primary user 124 desires to change the credentials, the primary user 124 can perform the setup or initialization procedure again.

In a particular embodiment, the function-authorization settings 114 may include a global configuration access parameter (GCAP) (not shown) that would specify whether the function-access data for all of the protected functions (e.g., Function-1) are to be consulted in response to invocation attempts by the users of the electronic device 102. Furthermore, each function-access data element may also include a function-specific configuration parameter (FSCP) (not shown) that is examined, if the GCAP parameter indicates that function access control is to be enforced for all protected functions. Although the GCAP may indicate an enabled status, the FSCP parameter of each protected function could indicate whether such access control mechanism is enabled for any specific protected function. If the GCAP indicates a disabled state, then access controls are not enforced for any protected function regardless of the function-access data for such protected function.

At a later point in time, a secondary user 126 may wish to access Function-1 on the electronic device 102. In one example, the secondary user 126 may be a child of the primary user 124. In another example, the secondary user 126 may be the same individual as the primary user 124, accessing the protected function at a later point in time. For example, Function-1 may enable access to the access network 140 (e.g., the Internet) and the secondary user 126 may wish to access resource-1 142A via the access network 140. The secondary user 126 may wish to access Function-1 on the electronic device 102 while the primary user 124 is logged into the electronic device 102 but is not currently using the electronic device 102. Accordingly, the secondary user 126 may enter, and the electronic device 102 may receive, a request 132 to perform Function-1 (for example, the secondary user 126 may attempt to invoke an Internet browser program). The electronic device 102 may generate and communicate a prompt 134 for user access credentials in response to receiving the request 132. The secondary user 126 may enter and the electronic device 102 may receive the user access credentials 136 identifying the secondary user 126 in response to the prompt 134 for user access credentials.

The electronic device 102 determines whether the received user access credentials 136 match the function-access data 116 associated with Function-1. For example, the electronic device 102 may determine if the identity of the secondary user 126 is specified in either the user ID information 120A included in function-1 access-data-1 118A or specified in the user ID information 120B included in function-1 access-data-2 118B and then the electronic device 102 may determine that the received user access credentials 136 match the function-access data 116 associated with Function-1. For example, the user ID information 120A may specify access credentials for a first child and the user ID information 120B may specify access credentials for a second child as described above. In this example, if the secondary user 126 is either the first child or the second child, the electronic device 102 will determine that the received user access credentials 136 match the function-access data 116 associated with Function-1. However, if the secondary user 136 is a third child, then the electronic device 102 will determine that the received user access credentials 136 do not match the function-access data 116 associated with Function-1 and the invocation of Function-1 is rejected.

When the received user access credentials 136 match the function-1 access-data-1 118A associated with Function-1, the electronic device performs Function-1 in accordance with the usage restrictions 122A in the function-1 access-data-1 118A associated with the user identified by the received user access credentials 136. For example, if the secondary user 126 is the first child, then the electronic device 102 will perform Function-1 in accordance with the usage restrictions 122A included in function-1 access-data-1 118A. If the secondary user 126 is the second child, then the electronic device 102 will perform Function-1 in accordance with the usage restrictions 122B included in function-1 access-data-2 118B.

If during the performing of Function-1, the continuance of performing Function-1 would not be in accordance with the usage restrictions 122A included in function-1 access-data-1 118A, the user interface component of the electronic device 102 may automatically terminate the performing of Function-1. In particular embodiment, the first child requests Function-1 (e.g., access to the Internet) and the usage restrictions 122A included in the function-1 access-data-1 118A indicate that the first child is authorized to perform the function for a limited amount of time (e.g., one hour). If the first child performs Function-1 for more than the limited amount of time, the user interface component of the electronic device 102 automatically terminates Function-1 one hour after invocation of Function-1 by that child. In another particular embodiment, the first child requests Function-1 (e.g., access to the Internet) and the usage restrictions 122A included in the function-1 access-data-1 118A indicate that the first child is not authorized to perform Function-1 between a time frame of 10:00 pm and 8:00 am. The electronic device 102 will perform Function-1 if the current time is 9:00 pm, for example. However, if the user interface component of the electronic device 102 is still performing Function-1 (i.e., the first child is still accessing the Internet) at 10:00 pm, then the user interface component of the electronic device 102 automatically terminates the performance of Function-1, thereby halting the first child's access to the Internet.

Figure 2:
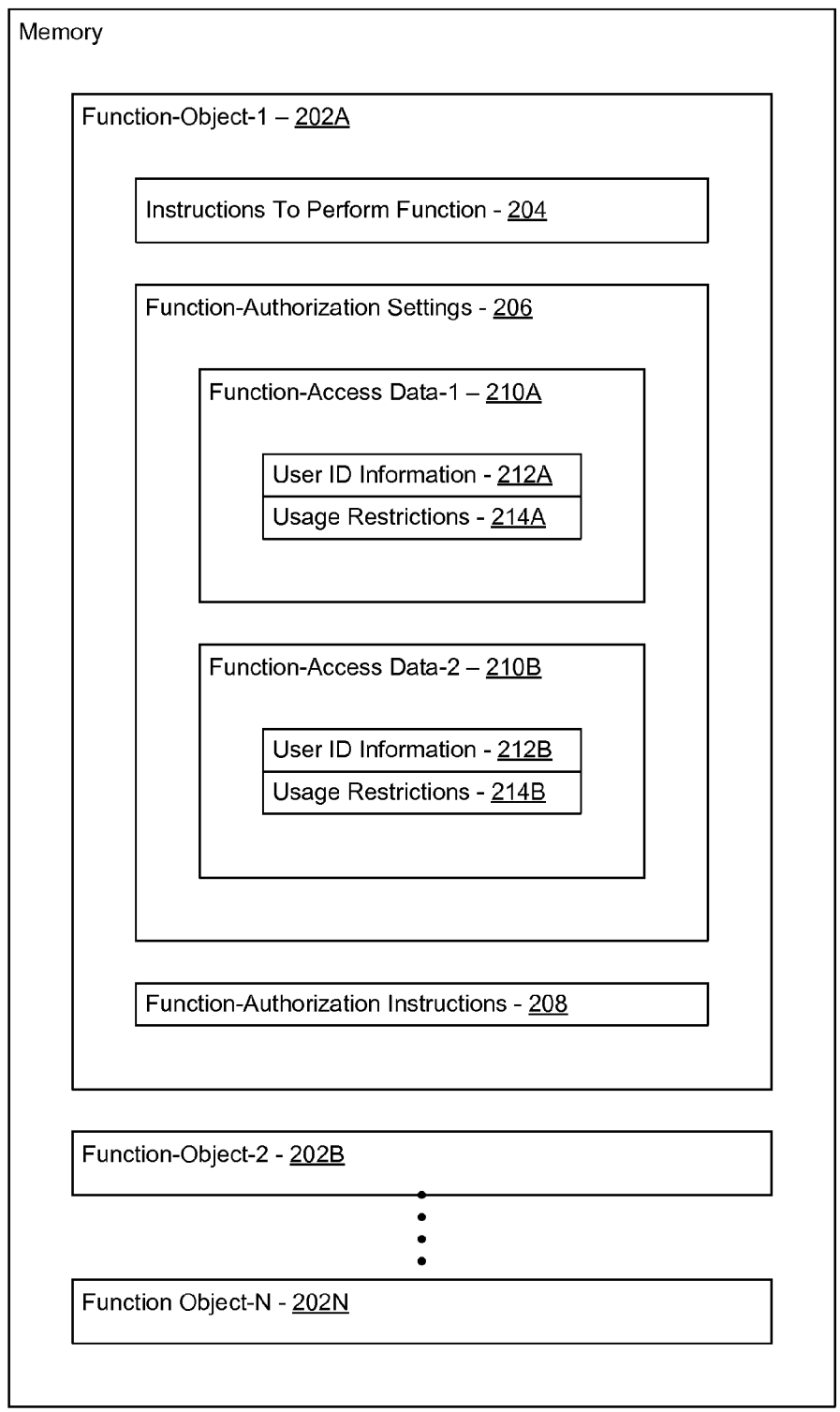
FIG. 2 is a diagram of an embodiment of a data structure to provide function-based authorization to access an electronic device.

Referring to FIG. 2, an illustrative embodiment of a data structure to provide function-based authorization to access one or more functions on an electronic device is disclosed. In particular embodiments, the memory 200 replaces the memory 108 of the electronic device 102 of FIG. 1. The memory 200 of the electronic device includes function-object-1 202A. Function-object-1 202A comprises a data structure including computer-executable instructions 204 to perform a particular function associated with an electronic device. The data structure also includes function-authorization settings 206. The function-authorization settings 206 include function-access data-1 210A and function-access data-2 210B. The function-access data-1 210A includes user ID information 212A and usage restrictions 214A. The function-access data-2 210B includes user ID information 212B and usage restrictions 214B. In particular embodiments, the function-authorization settings 206 include the same information or similar types of information as the function-authorization settings 114 illustrated in FIG. 1. User ID information can include both identity and password information, and is also referred to as user credentials herein.

The data structure also includes function-authorization instructions 208. Function-authorization instructions 208 include computer-executable instructions to perform operations including receiving, at the electronic device, a request to perform the particular function associated with the electronic device. The operations also include prompting for user access credentials in response to receiving the request and receiving the user access credentials in response to prompting for user access credentials. The operations also include determining whether the received user access credentials match the function-access data 210A, 210B associated with the particular function. The operations also include performing the particular function in accordance with usage restrictions 214A, 214B in the function-access data 210A, 210B associated with a particular user identified by the received user access credentials when the received user access credentials match the function-access data-1 210A or the function-access data-2 210B associated with the particular function. It should be understood that object-oriented programming techniques and data structures other than the data structure shown in FIG. 2 may be used to implement embodiments disclosed herein. For example, the function-authorization instructions 208 may be stored in a central location in the memory 200 instead of being stored in each function object as shown in FIG. 2.

Implementing embodiments described herein using object-oriented programming techniques and data structures such as the data structure shown in FIG. 2 may allow a primary user 124 to more easily create hierarchical authorizations and access controls. For example, an authorization constraint applied to a high-level function (e.g., an authorization constraint applied to the top-item in a pull-down menu) may be inherited by and be applicable to all objects subservient to the high-level function (e.g., items listed in sub-menus of the pull-down menu), unless the inheritance is specifically over-written. For example, if a primary user 124 desired to apply a particular authorization constraint to all the items in a menu except for one item, the primary user may apply the authorization constraint to the menu such that all the items in the menu inherit the authorization constraint. The primary user 124 can then over-write the authorization constraint on the one item to which the authorization constraint does not apply to.

During operation, the electronic device receives a request to perform the particular function associated with the electronic device. The electronic device sends the request to function-object-1 202A and executes the function-authorization instructions 208. Function-object 202A receives the request to perform the particular function. Function-object-1 202A prompts for user access credentials in response to receiving the request and receives the user access credentials in response to the prompt for user access credentials. Function-object-1 202A determines whether the received user access credentials match the function-access data-1 210A or the function-access data-2 210B associated with the particular function. When the received user access credentials match the function-access data-1 210A or the function-access data-2 210B associated with the particular function, the electronic device executes the instructions 204 to perform the particular function in accordance with usage restrictions 214A in the function-access data-1 210A or with usage restrictions 214B in the function-access data-2 210B associated with a particular user identified by the received user access credentials.

Figure 3:
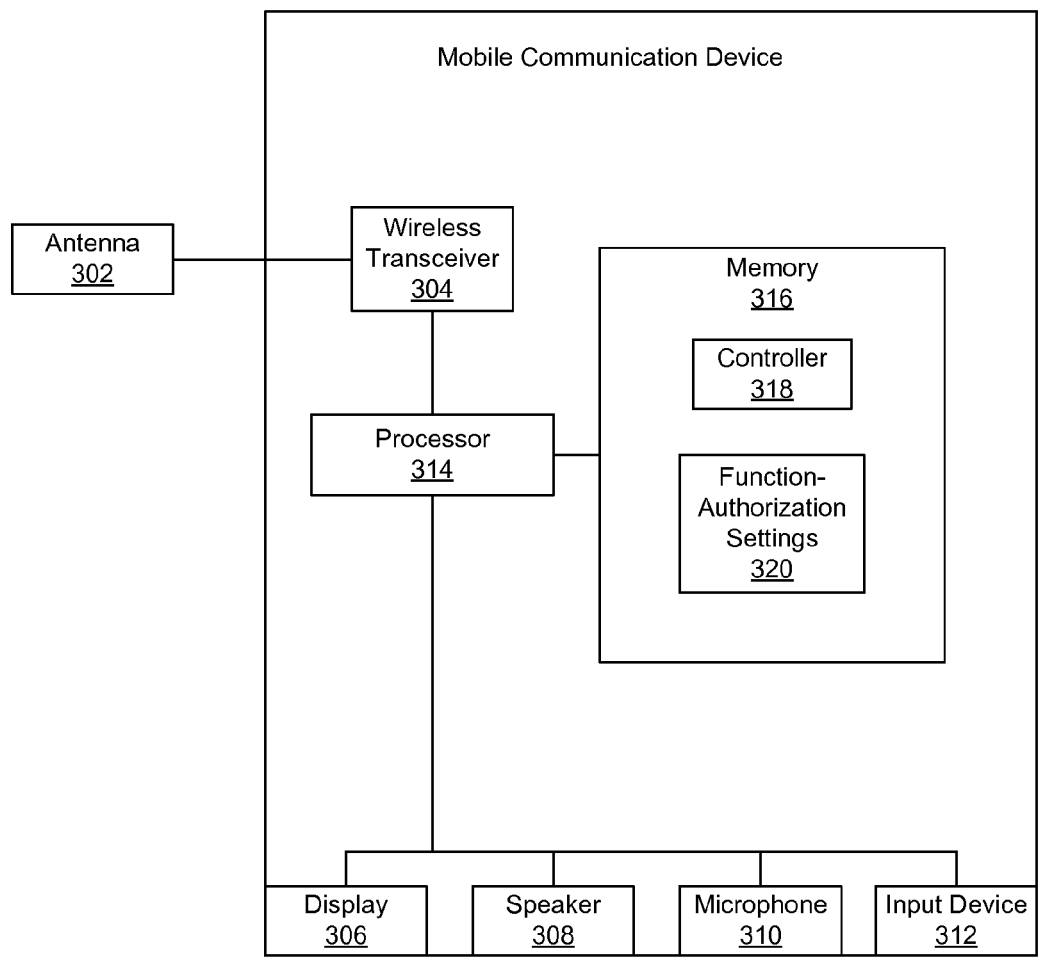
FIG. 3 is a block diagram of a mobile communication device providing function-based authorization to access functions of the mobile communication device.

Referring to FIG. 3, an illustrative embodiment of a mobile communication device 300 that provides function-based authorization to access particular functions is shown. The mobile communication device 300 includes an antenna 302 to transmit and receive data via a wireless network and a wireless transceiver 304 coupled to the antenna 302. The mobile communication device 300 also includes an input/output (I/O) interface to receive information from and output information to a user. The I/O interface comprises a display 306, a speaker 308, a microphone 310, and an input device 312 (e.g., a keypad). The mobile communication device 300 includes a processor 314 coupled to the wireless transceiver 304 and to the I/O interface. The mobile communication device 300 includes a memory device 316. The memory device 316 includes function-authorization settings 320. The function-authorization settings 320 may include the information of the function-authorization settings 114 of FIG. 1, for example. The memory device 316 is accessible to the processor 314 and includes executable instructions 318 (i.e., the controller) that, when executed by the processor 314, cause the mobile communication device 300 to perform operations including receiving, via the I/O interface, a request to generate function-authorization settings including function-access data associated with a particular function of the mobile communication device 300 to be protected. The operations include prompting, via the I/O interface, for the function-access data. The operations include receiving the function-access data via the I/O interface. The received function-access data includes first function-access data that specifies access credentials of a first user to access the particular function to be protected and second function-access data that specifies access credentials of a second user to access the particular function to be protected. The operations also include associating the received function-access data with the particular function to be protected and storing the function-authorization settings including the received function-access data at the memory device 316.

During a configuration operation, a primary user (e.g., a parent or a super-user of the device 300, who generally logs in to the device) may create or amend the function-authorization settings 320 to protect a particular function associated with the mobile communication device 300. Accordingly, the user may enter, and the mobile communication device 300 may receive, via the I/O interface, a request to generate function-authorization settings 320 including function-access data associated with one or more particular functions. The mobile communication device 300 may prompt for and receive user-authorization credentials identifying the primary user as a user authorized to generate the function-authorization settings 320. The mobile communication device 300 may then prompt for and receive the function-access data. The function-access data includes first function-access data that specifies access credentials of a first secondary user (e.g., a first child or a first subordinate) to access the particular function to be protected and second function-access data that specifies access credentials of a second secondary user (e.g., a second child or a second subordinate) to access the particular function to be protected. The mobile communication device 300 associates the received function-access data with the particular function to be protected and stores the function-authorization settings 320 including the received function-access data at the memory device 316 of the mobile communication device 300.

Figure 4:
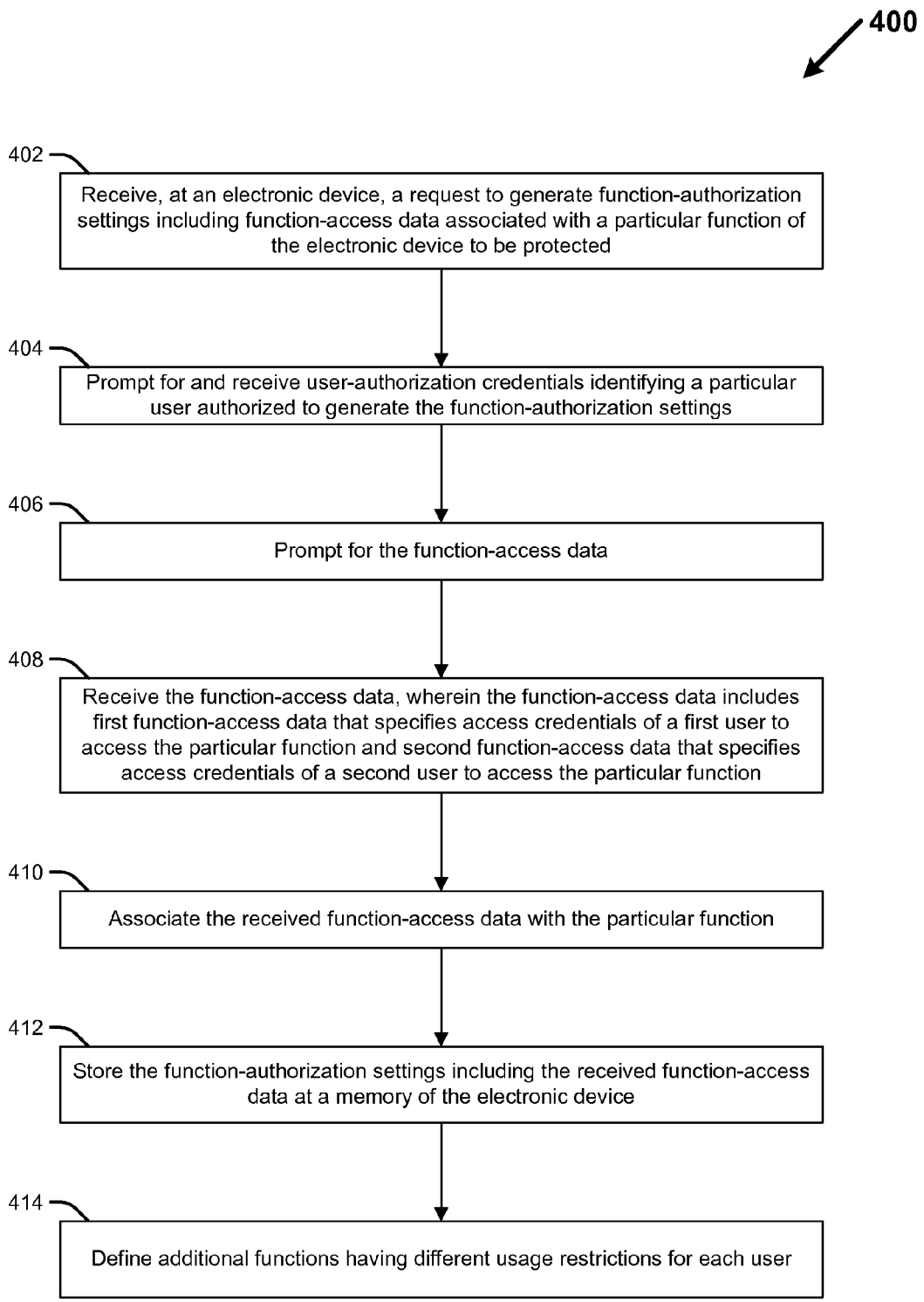
FIG. 4 is a flow chart of a particular embodiment of a method of providing function-based authorization to access an electronic device.

FIG. 4 depicts a flow chart of a particular embodiment of a method 400 of providing function-based authorization to access an electronic device. The method 400 can be performed, for example, by electronic devices including a personal computer, a server, a set top box, or a mobile communication device (e.g., a PDA or a wireless phone), such as the mobile communication device 300 of FIG. 3. The electronic device performing the method 400 receives a request to generate function-authorization settings including function-access data associated with a particular function of the electronic device to be protected, at 402. In particular embodiments, the electronic device comprises a set top box configured to communicate with a television system, such as an internet protocol television (IPTV) system or a cable television system, for example. In particular embodiments, the particular function to be protected comprises access to a subscription service associated with the set top box. In a particular embodiment, the subscription service includes access to a particular channel or to particular media content, which may be selected by following one or more specific user interface menu items. For example, the particular channel may be a premium channel that accrues additional charges to a subscriber.

The function-authorization settings may comprise, for example, the function-authorization settings 114 of FIG. 1, the function-authorization settings 206 of FIG. 2, or the function-authorization settings 320 of FIG. 3. Advancing to 404, the electronic device prompts for and receives user-authorization credentials identifying a particular user authorized to generate the function-authorization settings. The particular user may be the primary user 124 of FIG. 1, for example. The particular user may be a parent wishing to generate access controls for secondary users (e.g., children) of the electronic device.

The electronic device prompts for the function-access data, at 406, and the electronic device receives the function-access data, at 408. In a particular embodiment, the received function-access data includes first function-access data that specifies access credentials of a first user to access the particular function to be protected and second function-access data that specifies access credentials of a second user to access the particular function to be protected. The received function-access data may comprise the function-access data 130 of FIG. 1, for example. The electronic device associates the received function-access data with the particular function to be protected, at 410. Advancing to 412, the electronic device stores the function-authorization settings including the received function-access data at a memory of the electronic device. In a first particular embodiment, the memory comprises the memory 108 of FIG. 1 and the function-authorization settings comprise the function-authorization settings 114. In a second particular embodiment, the memory comprises the memory 200 of FIG. 2 and the function-authorization settings comprise the function-authorization settings 206. In a third particular embodiment, the memory comprises the memory 316 of FIG. 3 and the function-authorization settings comprise the function-authorization settings 320.

In accordance with embodiments disclosed herein, additional functions can be defined on an electronic device with each function having different usage restrictions for each user authorized to perform the function, at 414. In a particular embodiment, a parent can generate different usage restrictions for each child in the family that uses a particular electronic device, such as a mobile communication device or a desktop computer having access to the Internet, for example. The parent may give herself unrestricted access to a browser that enables access to the Internet on a mobile communication device, for example. The parent may give an oldest child authority to access the browser, but only after a time (e.g., 10:00) determined by the parent. The parent may give a younger child authority to access the browser as well, but may only give authority to access the browser at a different time (e.g., 8:00). Alternatively, the parent may choose to not give the younger child authority to access the browser at all. The parent may allow all users unrestricted access to some functions on the mobile communication device. For example, the parent may wish to allow any user of the mobile communication device to place a "911" call by invoking a call function icon or button. As another example, the parent may disable access to an Internet browser function of a mobile device to avoid excessive charges.

In another particular embodiment, a supervisor can generate different usage restrictions for different subordinates or visitors that are users of a desktop computer in a work environment. For example, the supervisor may log into a desktop computer using his primary user credentials and may authorize a first subordinate to access particular functions that enable access to certain highly confidential or highly sensitive information. Additionally, the supervisor may choose to not authorize a second subordinate or visitors to have access to the particular functions. For functions other than the particular functions, the supervisor may choose to authorize all users to perform the other functions.

Figure 5:
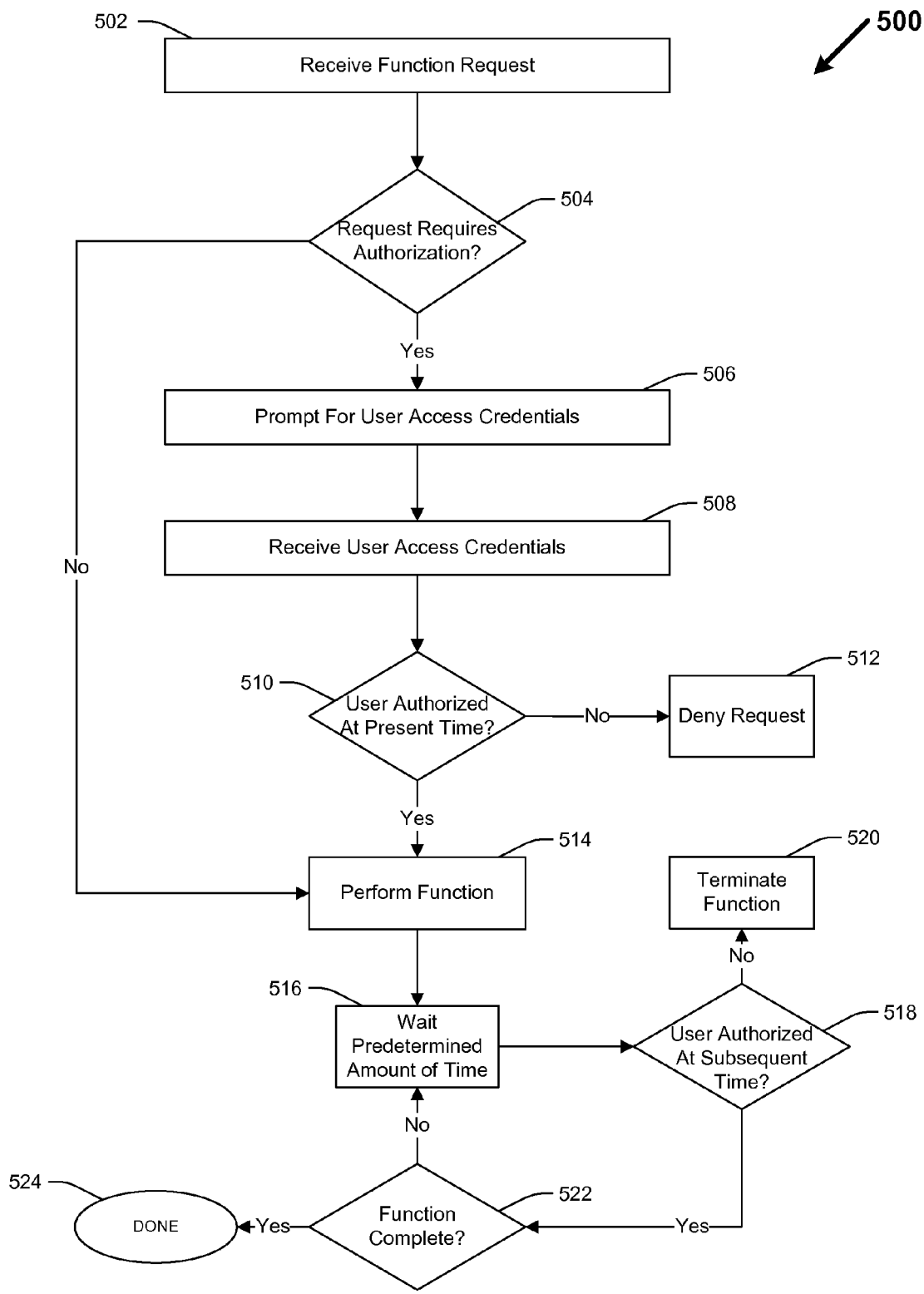
FIG. 5 is a flow chart of a second particular embodiment of a method of providing function-based authorization to access an electronic device.

FIG. 5 depicts a flow chart of a particular embodiment of a method 500 of accessing a particular restricted function of an electronic device that has function-based authorization. The method 500 can be performed, for example, by electronic devices including a personal computer, a server, a set top box, or a mobile communication device, such as the mobile communication device 300 of FIG. 3. The electronic device performing the method 500 receives a request to perform a particular function associated with the electronic device, at 502. Advancing to 504, the electronic device determines whether the particular function requires authorization before the particular function can be performed. In a particular embodiment, the electronic device includes one or more functions that any user is authorized to perform. For example, a mobile communication device may allow any user of the device to invoke an icon or press a button to place a "911" call without having to enter any user credentials. The mobile communication device may authorize certain, but not all, users to invoke an Internet browser.

When the particular function does not require authorization before the particular function can be performed, the method 500 advances to 514 and the electronic device begins performing the particular function. When the particular function requires authorization before the particular function can be performed, the method 500 advances to 506 and the electronic device prompts for user access credentials, at 506. Advancing to 508, the electronic device receives user access credentials. The electronic device determines whether the user is authorized to perform the particular function at the time of the request (e.g., a current time as determined by a clock of the electronic device), at 510. When the user is not authorized to perform the particular function at the present time or at any time, the method advances to 512 and the electronic device denies the user's request to perform the particular function. When the user is authorized to perform the particular function at the present time, the method 500 advances to 514 and the electronic device begins performing the particular function.

Advancing to 516, the electronic device waits for a predetermined amount of time. The electronic device determines if the user is authorized to perform the particular function at the subsequent time, at 518. When the user is not authorized to perform the particular function at the subsequent time, the method advances to 520 and the electronic device automatically terminates the performance of the particular function. When the user is authorized to continue to perform the particular function at the subsequent time, the method advances to 522. The electronic device determines whether performance of the particular function is complete, at 522. When the performance of the particular function is not complete the method returns to 516 to continue monitoring the time-related and other restrictions on the user's performance of the particular function. When the performance of the particular function is complete, the method ends, at 524.

Figure 6:
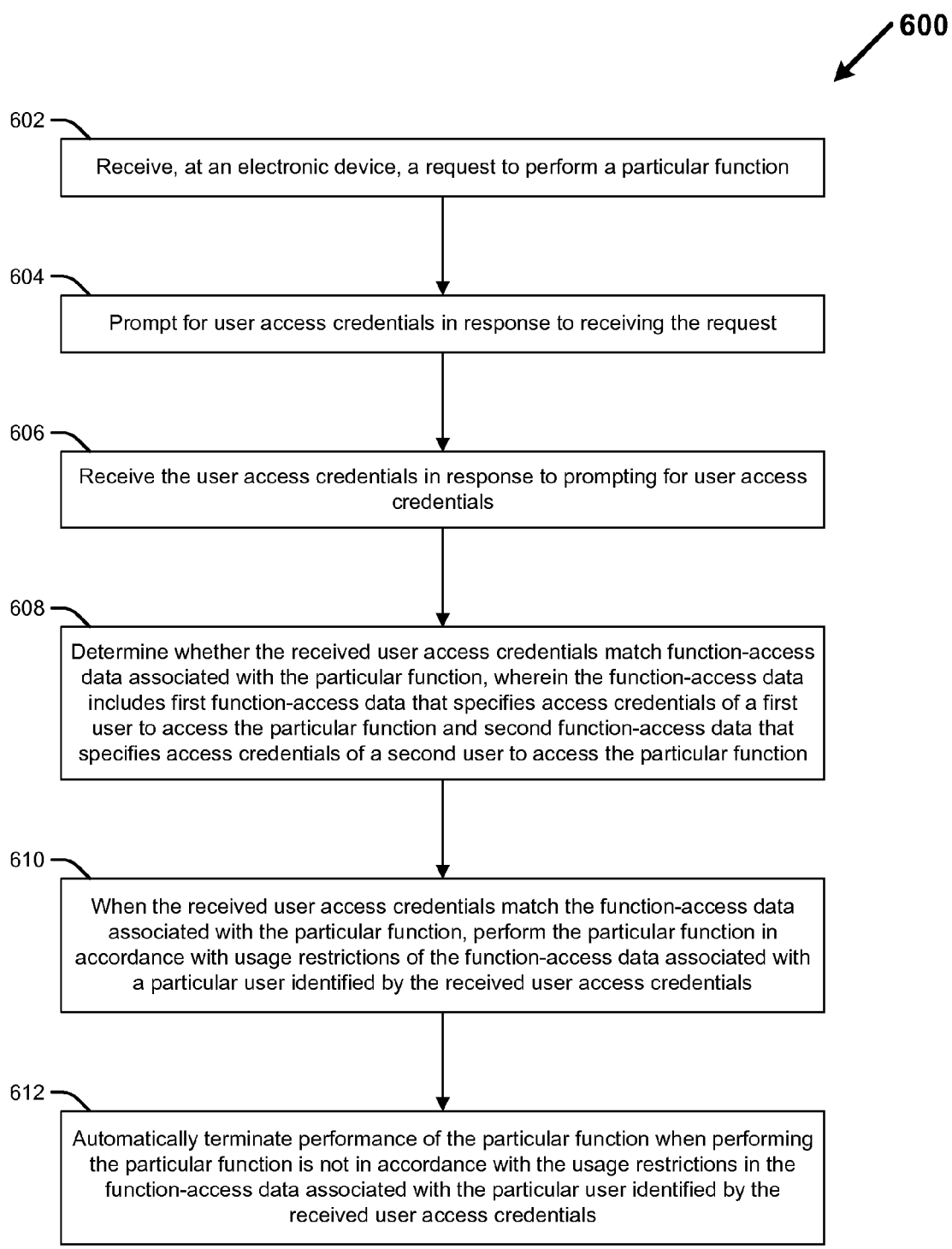
FIG. 6 is a flow chart of a third particular embodiment of a method of providing function-based authorization to access an electronic device.

FIG. 6 depicts a flow chart of a particular embodiment of a method 600 of providing function-based authorization to access an electronic device. The method 600 can be performed, for example, by electronic devices including a personal computer, a server, a set top box, or a mobile communication device, such as the mobile communication device 300 of FIG. 3. The electronic device performing the method 600 receives a request to perform a particular function, at 602. In particular embodiments, the particular user is the secondary user 126 of FIG. 1 and the request comprises the function request 132. Advancing to 604, the electronic device prompts for user access credentials in response to receiving the request. The electronic device receives the user access credentials in response to prompting for the user credentials, at 606.

Advancing to 608, the electronic device determines whether the received user access credentials match function-access data associated with the particular function. In a particular embodiment, the function-access data includes first function-access data that specifies access credentials of a first user to access the particular function and second function-access data that specifies access credentials of a second user to access the particular function. In particular embodiments, the user access credentials include a user-id and a password and determining whether the received user access credentials match the function-access data associated with the particular function includes determining whether the stored function-access data includes a user-id and a password that match the user-id and the password included in the received user access credentials. In a first particular embodiment, the function-access data associated with the particular function comprises the function-access data 116 of FIG. 1. In a second particular embodiment, the function-access data associated with the particular function comprises the function-access data 210A and the function-access data 210B of FIG. 2. In a particular embodiment, at least a portion of the stored function-access data, such as credential data, is stored in secure memory. In another particular embodiment, some or all of the stored function-access data is encrypted.

Advancing to 610, the electronic device performs the particular function in accordance with usage restrictions defined in the function-access data associated with a particular user identified by the received user access credentials. In a first example, the usage restrictions associated with a particular user identified by the received access credentials may comprise the usage restrictions 122A or the usage restrictions 122B of FIG. 1. In a second example, the usage restrictions associated with a particular user identified by the received access credentials may comprise the usage restrictions 214A or the usage restrictions 214B of FIG. 2. The electronic device may automatically terminate the performance of the particular function when performing the particular function is not in accordance with the usage restrictions in the function-access data associated with the particular user identified by the received user access credentials, at 612. For example, performing the particular function may be in accordance with the usage restrictions associated with the particular user at the time the electronic device starts performing the particular function, but continuing the performance of the particular function may not be in accordance with the usage restrictions associated with the particular user at a later point in time.

Providing function-based authorization on electronic devices in accordance with embodiments disclosed herein allows an electronic device to be shared among a plurality of users (e.g., family members or employees in a work place) within the user interface logged-in environment of the primary user with each of the secondary users having different usage restrictions for different functions on the shared electronic device. The electronic device can be shared among the plurality of users while reducing unauthorized activity by the users. For example, a parent may with to lend their cellular phone to a second person, such as a family member or a friend. The parent may wish to limit or restrict the activity for which the second person can use the cellular phone. For example, when lending the cellular phone to a child (or other minor), the parent may wish the child to be authorized to place telephone calls from the cellular phone but not to be authorized to access the Internet from the cellular phone. However, when lending the cellular phone to a friend (or other adult), the parent may wish to authorize the friend to place telephone calls from the cellular phone as well as authorize the friend to access the Internet from the cellular phone. However, the parent may wish to restrict the friend from using the cellular phone to access adult websites on the Internet. Thus, in accordance with embodiments disclosed herein, each user of the cellular phone may have different usage restrictions for each protected function of the cellular phone.

In another example, an employer may keep a particular workstation running for extended periods of time, during which a plurality of different employees may have access to the workstation and the windowing user interface environment of the logged-in primary user is not disabled (e.g., is not locked). In accordance with embodiments disclosed herein, the employer can configure the workstation for an operating system account of a primary user such that each of the plurality of employees is authorized to access the functions that they need to access to accomplish their assigned tasks. The employer can also configure the workstation such that each of the employees not authorized to access functions that they do not need to access to accomplish their assigned tasks. The employer can also configure the workstation to enforce different usage restrictions on functions for different users that are authorized to access the functions. Thus, in accordance with embodiments disclosed herein, each user of the workstation may have different usage restrictions for each protected function of the workstation.

Referring to FIG. 7, an illustrative embodiment of a general computer system is shown and is designated 700. The computer system 700 can include a set of instructions that can be executed to cause the computer system 700 to perform any one or more of the methods or computer-based functions disclosed herein. For example, the computer system 700 may include instructions that are executable to perform the methods 400, 500, or 600 shown in FIGS. 4-6. In a particular embodiment, the computer system 700 includes instructions of the controller 112 and the function-authorization settings 114 shown in FIG. 1. In another embodiment, the computer system 700 includes the function objects shown in FIG. 2. In another embodiment, the computer system 700 includes the controller 318 and the function-authorization settings 320 shown in FIG. 3. The computer system 700 may be connected to other computer systems or peripheral devices via a network, such as the network 140 shown in FIG. 1. The computer system 700 may include or be included within, for example, computing devices and set top boxes.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), a projection television display, a flat panel display, a plasma display, or a solid state display. Additionally, the computer system 700 may include an input device 712, such as a remote control device having a wireless keypad, a keyboard, a microphone coupled to a speech recognition engine, a camera such as a video camera or still camera, or a cursor control device 714, such as a mouse device. The computer system 700 can also include a disk drive unit 716, a signal generation device 718, such as a speaker, and a network interface device 720.

In a particular embodiment, as depicted in FIG. 7, the disk drive unit 716 may include a computer-readable medium 722 in which one or more sets of instructions 724, e.g. software, can be embedded. One or more function objects 726 also can be embedded in the computer-readable medium 722. Further, the instructions 724 may embody one or more of the methods, such as method 400, method 500 and method 600, or logic as described herein. The function objects 726 may embody the function objects 202 of FIG. 2, for example. In a particular embodiment, the instructions 724 and the function objects 726 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all modifications, enhancements, and other embodiments, that fall within the true scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a function access request at a processor of a mobile communication device;
   determining, via a check by the processor of a global access parameter stored in a memory of the mobile communication device, whether restricted access to functions is active for the mobile communication device in response to the function access request;
   when restricted access to functions is active for the mobile communication device:
      determining, via a check by the processor of function-access data stored in the memory, that a particular function associated with the function access request requires access credentials;
      sending a prompt for the access credentials to a display of the mobile communication device;
      receiving user input of the access credentials in response to the prompt;
      determining, via a comparison by the processor of the user input to corresponding credential data of the function-access data and via verification by the processor that access limitation data of the function-access data corresponding to the particular function is satisfied, that access to the particular function is permitted; and
      providing, via the processor, access to the particular function while the access limitation data of the function-access data corresponding to the particular function remains satisfied.

2. The method of claim 1, wherein the access limitation data corresponding to the particular function includes a temporal access limitation that allows usage of the particular function in a time range between a first time and a second time.

3. The method of claim 1, wherein the particular function enables internet access.

4. The method of claim 1, wherein the particular function comprises access to a subscription service associated with the mobile communication device.

5. The method of claim 4, wherein performing the particular function accrues charges to a subscriber.

6. The method of claim 1, wherein the particular function enables sending and receiving email messages.

7. The method of claim 1, further comprising allowing access to the particular function associated with the function access request when restricted access is not active for the mobile communication device.

8. The method of claim 1, wherein the user input includes a user name and a password.

9. The method of claim 1, wherein the particular function is a high-level function, and wherein the access limitation data associated with the particular function applies to a function subservient to the particular function.

10. The method of claim 1, wherein the access limitation data for the particular function includes a temporal access limitation that allows usage of the particular function for a preset amount of time.

11. The method of claim 10, further comprising automatically terminating the particular function when the preset amount of time expires.

12. The method of claim 1, wherein the global access parameter is a function-authorization setting of a plurality of function-authorization settings.

13. The method of claim 12, further comprising sending a second prompt to the display for an access credential of a primary user of the mobile communication device when a request to access the plurality of function-authorization settings is received.

14. The method of claim 1, wherein the access limitation data corresponding to the particular function for a particular user indicates that the particular function can be performed regardless of a current time.

15. The method of claim 1, wherein the access limitation data corresponding to the particular function for a particular user indicates that the particular function can be performed without restriction.

16. A computer-readable storage device comprising computer-executable instructions that, when executed by a processor of a mobile communication device, cause the processor to perform operations including:
   receiving a function access;
   determining in response to the function access request that a global access parameter stored in a memory of the mobile communication device indicates that restricted access to functions is active for the mobile communication device;
   determining, via a check of function-access data stored in the memory, that a particular function associated with the function access request requires access credentials;

sending a prompt for access credentials to a display of the mobile communication device in response to the global access parameter indicating that restricted access to functions is active;

receiving user input of the access credentials in response to the prompt;

determining, via a comparison of the user input to corresponding credential data of the function-access data and via verification that access limitation data of the function-access data corresponding to the particular function is satisfied, that access to the particular function is permitted; and providing access to the particular function while the access limitation data of the function-access data corresponding to the particular function remains satisfied.

17. The computer-readable storage device of claim 16, wherein the access limitation data corresponding to the particular function includes a temporal access limitation that allows usage of the particular function in a time range between a first time and a second time.

18. The computer-readable storage device of claim 16, wherein the access limitation data corresponding to the particular function includes a temporal access limitation that allows usage of the particular function for a preset amount of time.

19. The computer-readable storage device of claim 16, wherein the operations further include enabling the particular function when the function-access data indicates that the particular function does not require access credentials.

20. The computer-readable storage device of claim 16, wherein the access limitation data corresponding to the particular function inhibits access to a set of websites.

21. The computer-readable storage device of claim 20, wherein the set of websites comprises adult web sites.

22. The computer-readable storage device of claim 16, wherein the operations further include terminating access to the particular function when the access limitation data of the function-access data corresponding to the particular function remains is not satisfied.

23. A computer-readable storage device comprising instructions, that when executed by a processor of a mobile communication device, cause the processor to perform operations including:

receiving a function access request;

determining that a global access parameter stored in a memory of the mobile communication device indicates that restricted access to functions is active for the mobile communication device in response to the function access request;

determining, via a check of function-access data stored in the memory, that a particular function associated with the function access request requires access credentials;

sending a prompt for the access credentials to a display of the mobile communication device in response to the function access request;

receiving user input of the access credentials in response to the prompt;

determining, via a comparison of the user input to corresponding credential data of the function-access data and via verification that access limitation data of the function-access data corresponding to the particular function is satisfied, that access to the particular function is permitted;

providing access to the particular function when access is permitted;

making a determination during provision of access to the particular function whether access to the particular function remains permissible based on the access limitation data corresponding to the particular function; and terminating access to the particular function when the determination is that access to the particular function is not permitted based on the access limitation data corresponding to the particular function.

24. A mobile communication device comprising:

an antenna;

a transceiver coupled to the antenna;

an input/output interface;

a processor coupled to the transceiver and to the input/output interface;

a memory device accessible to the processor and including executable instructions that, when executed by the processor, cause the mobile communication device to perform operations including:

receiving, via the input/output interface, a function access request associated with a particular function of the mobile communication device;

determining in response to the function access request that a global access parameter stored in the memory device indicates that restricted access to functions is active for the mobile communication device;

determining, via a check of function-access data stored in the memory device, that the particular function requires access credentials;

prompting, via the input/output interface, for user input of the access credentials;

receiving, via the input/output interface, the user input;

determining via a comparison of the user input to corresponding credential data of the function-access data and via verification that access limitation data of the function-access data corresponding to the particular function is satisfied, that access to the particular function is permitted; and providing access to the particular function while the access limitation data of the function-access data corresponding to the particular function remains satisfied.

25. The mobile communication device of claim 24, wherein the particular function enables sending and receiving email messages.

* * * * *